Oct. 14, 1930.    G. KOOL ET AL    1,778,530
PACKAGE BANDING TOOL
Filed Sept. 12, 1927    4 Sheets-Sheet 2

Inventors
Gert Kool
Adrianus van Duyn
By Williams, Bradbury,
McCaleb & Hinkle
Attys.

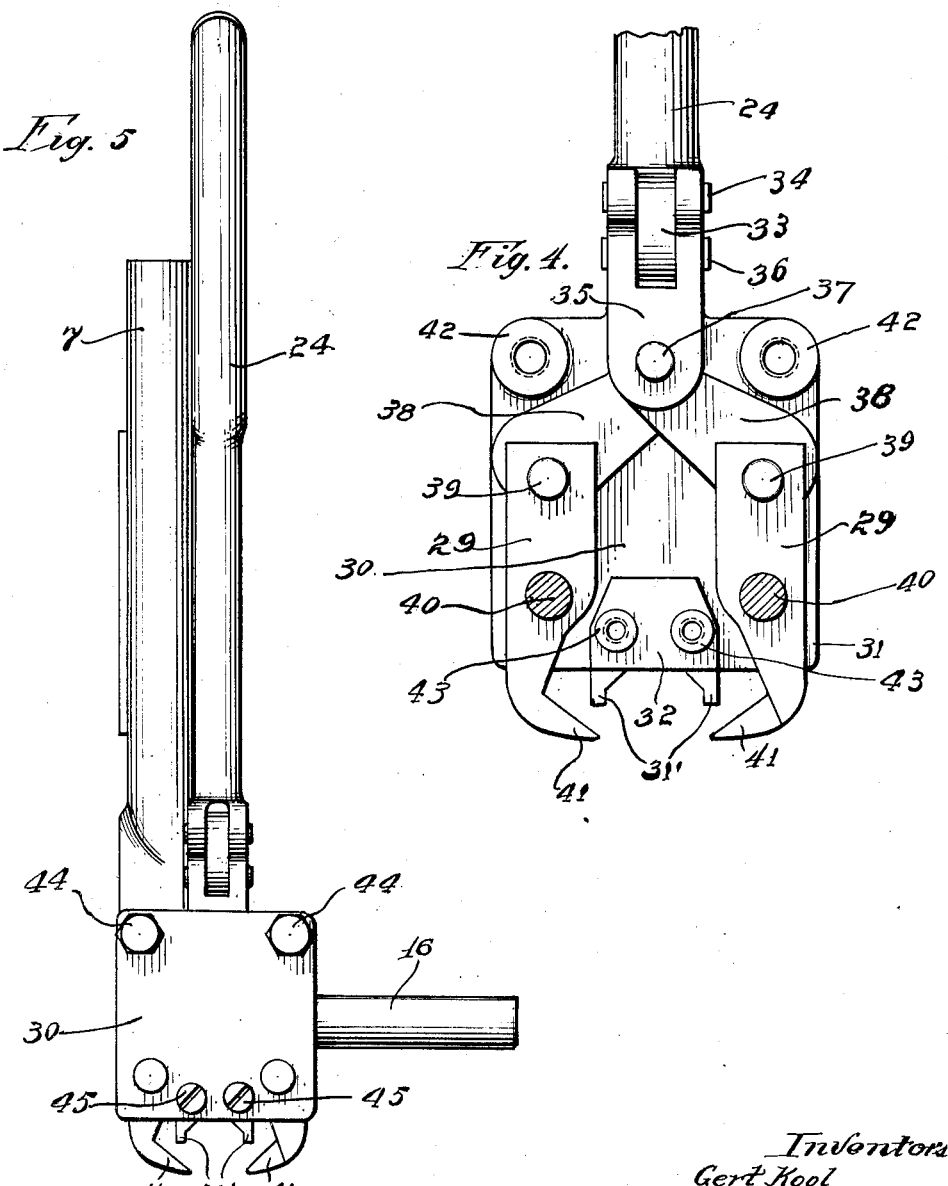

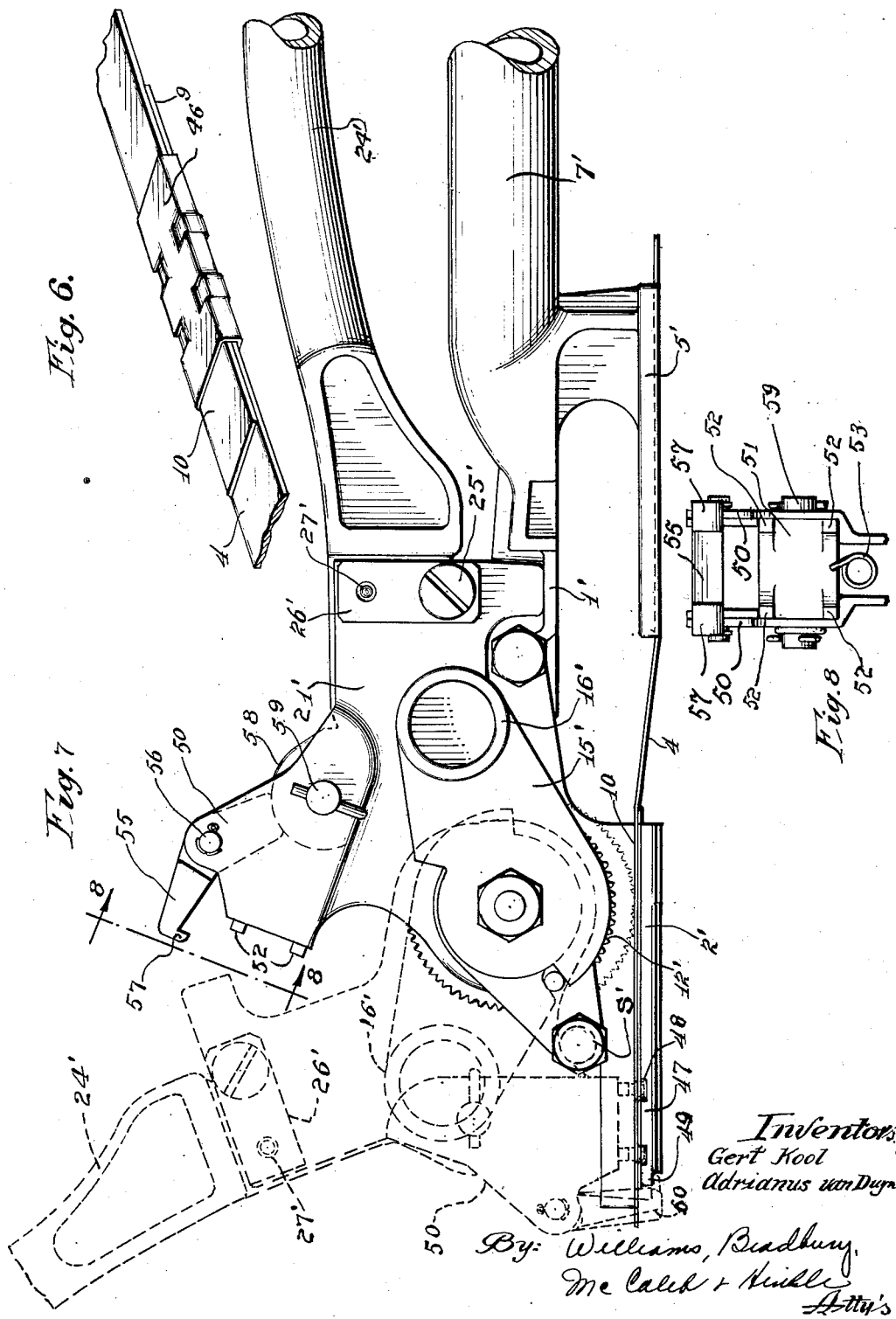

Patented Oct. 14, 1930

1,778,530

UNITED STATES PATENT OFFICE

GERT KOOL, OF THE HAGUE, AND ADRIANUS VAN DUYN, OF ROTTERDAM, NETHERLANDS, ASSIGNORS, BY MESNE ASSIGNMENTS, TO SIGNODE STEEL STRAPPING COMPANY, A CORPORATION OF DELAWARE

PACKAGE-BANDING TOOL

Application filed September 12, 1927, Serial No. 219,165, and in the Netherlands November 5, 1926.

Our invention relates to package-banding tools.

It is particularly applicable where packages, such for example as groups of merchandise units, boxes, crates, bales, etc. are held together or reenforced by encircling metal bands whose ends are fastened or sealed together after they have been tightly drawn about the package. Heretofore it has been the practice to employ two tools to apply the bands, one tool to tension a band about the package and another tool to fasten or seal together the ends of a tensioned band.

One of the objects of our invention is to provide an improved package-banding tool.

Another object is to provide a tool which, by the operation of a single handle, both tensions and seals together the ends of the band.

Another object is to provide a tool wherein a single handle may be operated in one range to apply tension to the band and which by prolongation of movement from said range be operated to fasten and seal together the ends of the band.

A further object is to provide a tool which, when placed in operative position upon the package about which the band is to be applied, need not be moved with respect to the package during the tensioning and fastening of the band.

A further object is to provide a tool which is compact, rugged, simple in construction, easy to operate, and inexpensive to manufacture.

Other objects and advantages of our invention will appear more fully from the following description and the accompanying drawings, in which similar characters of reference indicate similar parts throughout the several views.

This application is a continuation in part of our co-pending application Serial No. 190,752, filed May 12, 1927.

In the drawings:

Fig. 4 is a view similar to Fig. 3, but with the sealing mechanism of the tool in the position assumed during the band-tensioning operation;

Fig. 5 is a top, plan view of the tool, as shown in Fig. 1;

Fig. 6 is a perspective view illustrating a type of joint produced by the tool;

Fig. 7 is a side elevation of a modified tool embodying our invention; and

Fig. 8 is a view along the line 8—8 of Fig. 7.

Figure 1:
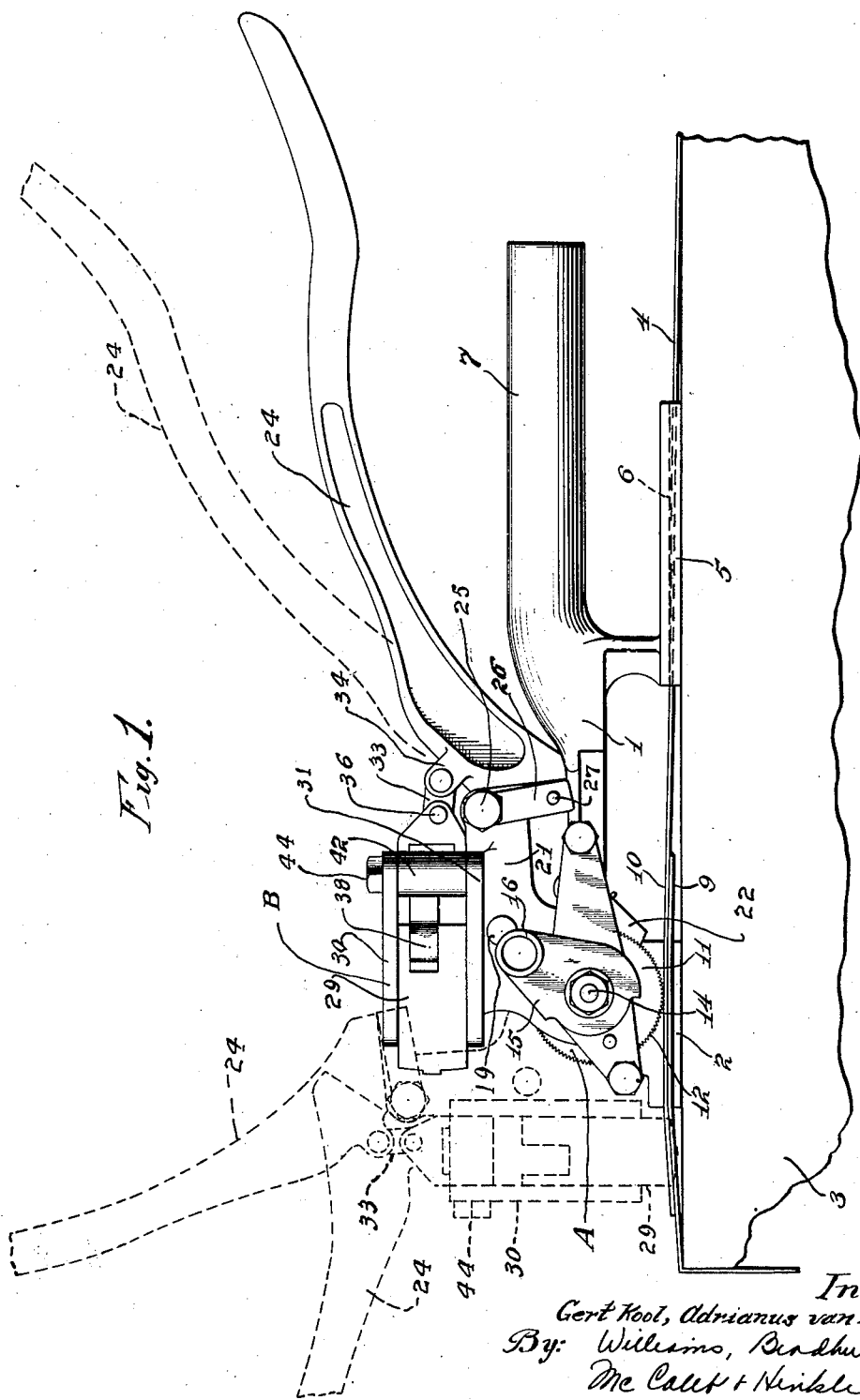
Fig. 1 is a side elevation of a tool embodying our invention.

The tool comprises, in general, a frame or body carrying a band-tensioning mechanism A and a band-fastening or sealing mechanism B for securing together the overlapped ends of the tensioned band. Both the tensioning mechanism and the sealing mechanism are actuated by the same operating lever. For the purpose of explaining the invention the tools herein illustrated and described are adapted to operate upon a package band in the form of a flat metal strip, the joint or seal between the overlapped ends thereof being reenforced by a metal sleeve or girth which surrounds and is deformed with the band ends when the joint is made.

The tool illustrated in Figs. 1 to 5 has a body member or frame 1 provided with a saddle 2 having a flat undersurface which is intended to rest directly upon a package 3 about which a binder-band 4 is to be fixed. A tail-piece 5, at the rearward portion of the body member, has a substantially flat undersurface in a plane common with the package engaging surface of saddle 2. A longitudinal groove 6 is provided in the undersurface of the tail-piece so that the tail-piece may bridge the band 4, permitting a straight pull upon the band. A handle 7 formed integral with body 1 and extending rearwardly therefrom beyond the rear end of tail-piece 5 affords a ready means for carrying, applying and holding the tool to the work. A gripping surface 8 (see Fig. 2) is formed on the upper surface of saddle 2 so as to frictionally engage the lower one of the overlapped ends 9 and 10 of band 4. Saddle 2 is so formed with respect to body 1 that the saddle may be moved laterally to a position beneath the overlapped ends 9 and 10 of the band.

The tensioning mechanism A of the tool includes two parallel rotatably-mounted gripping wheels 11, having circumferential, transversely-serrated, band-engaging surfaces 12. These serrated surfaces engage with the upper or overlapping end of the band so that, when the wheel is turned, the upper or overlapping end 10 will move therewith over the lower or overlapped end 9 to tighten the band while the lower end 9 is held stationary against gripping surface 8.

Gripping wheels 11 are rotatably mounted upon an eccentric portion 13 of a shaft 14 which has its ends journaled in body 1. An arm 15 extends radially from one end of the shaft and has a hand grip 16 at its outer end, by means of which shaft 14 may be oscillated upon its axis to lower and elevate the gripping wheels and thereby move the same into and out of engagement with the upper or overlapping end 10 of the band and, at the same time, cause the lower or overlapped end of the band to be forced against or released from the stationary gripping surface 8.

The means for rotating gripping wheels 11 consists in a spring pressed pawl 17 which engages with a ratchet wheel 18 rigidly attached to gripping wheels 11 and rotatably mounted upon portion 13 of shaft 14 between the gripping wheels. Pawl 17 is pivotally mounted at 19 between bifurcated portions 20 of a head 21. The bifurcated portions of the head straddle gripping wheels 11 and are pivotally mounted upon shaft 14 at each side of the gripping wheels. Thus oscillation of head 21 will cause progressive rotation in one direction of the gripping wheels. A second spring-pressed pawl 22 is mounted at 23 upon body 1 and also engages with ratchet wheel 18. The purpose of pawl 22 is to prevent rotation of gripping wheels 11 in a direction opposite to the direction of rotation of the gripping wheels when moved by pawl 17 and ratchet wheel 18 during oscillation of head 21. The means for oscillating head 21 consists in a handle 24 pivotally mounted at 25 upon head 21. A latch for holding handle 24 in the position shown in full lines in Fig. 1 with respect to head 21 consists in a spring-steel plate 26 carrying a ball 27, and a depression 28 in the base of handle 24 for receiving ball 27. The engagement between spring pressed ball 27 and handle 24 is sufficient to cause head 21 to move with the handle for the purpose of oscillating head 21. When head 21 is moved to position shown in Fig. 2 as when the tool is used for fastening the overlapping ends of band 4 and pressure is exerted upon handle 24 away from handle 7 the latch consisting of plate 26, ball 27, and depressed portion 28 of handle 24 will release to permit movement of handle 24 to the position shown in Fig. 2.

Figure 2:
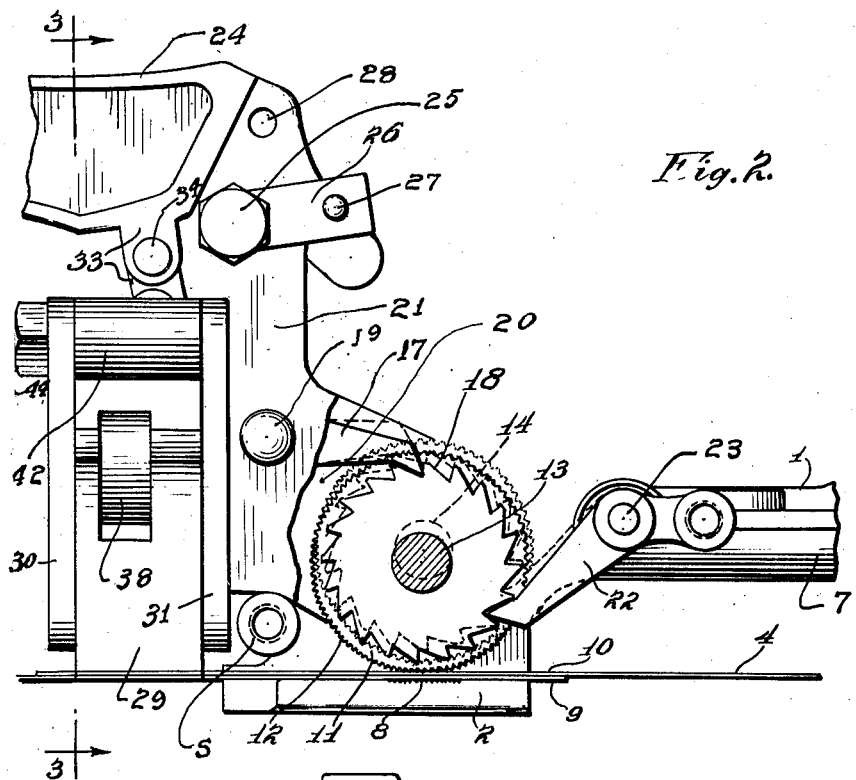
Fig. 2 is an enlarged, fragmentary view of the tool, with a part thereof in section.
Figure 3:
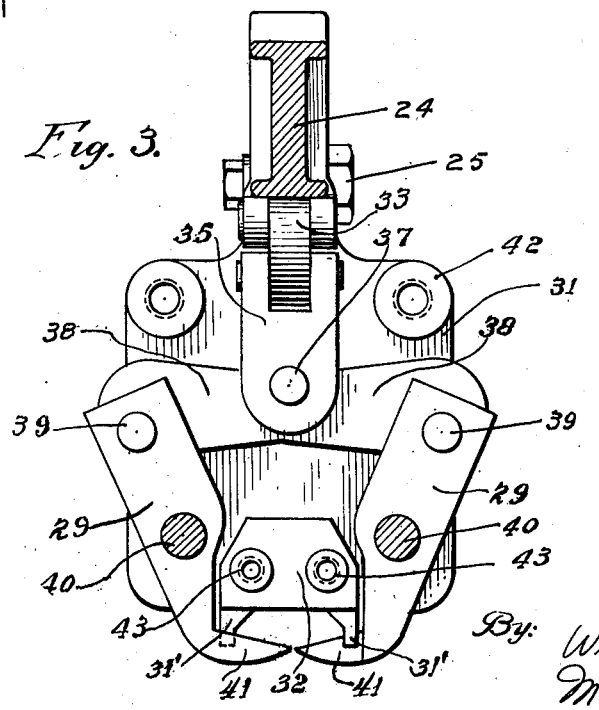
Fig. 3 is a sectional view along the line 3—3 of Fig. 2 with the sealing mechanism of the tool in position at the completion of the sealing or fastening operation.

The fastening or sealing mechanism B for securing the overlapped ends 9 and 10 of the band 4 together, and which is also operated by actuation of the lever 24, consists of a pair of jaws 29 supported between plates 30 and 31 carried by head 21 which when in operation grip and draw the overlapping ends of the band into engagement with depending teeth 31' of a block 32 mounted between plates 30 and 31, as shown in Figs. 3 and 4. Means for operating the jaws 29 by movement of handle 24 when latch 26—27 is disengaged from depressed portion 28 of handle 24 in the manner described comprises a link 33 pivotally connected at 34 to handle 24 and at its opposite end to a plunger 35 at 36. Plunger 35 is free to move longitudinally between plates 30 and 31 and is pivotally connected at 37 to a pair of links 38. Each of the links 38 is pivotally connected at its opposite end 39 to the inner ends of jaws 29. Jaws 29 are pivotally mounted at a point between their mid points and outer ends upon shafts 40, which shafts are carried at their opposite ends by plates 30 and 31 respectively. The outer ends 41 of jaws 29 have their inner faces, i. e., faces adjacent to depending teeth 31', inclined so that as jaws 29 close to the position shown in Fig. 3 by movement of handle 24 to the position shown in Fig. 2, the overlapping ends of band 4 are forced upwardly and forcefully into engagement with teeth 31' to deform the band and securely fasten the overlapped ends together. Plate 31 is formed integrally with head 21 and plate 30 is spaced apart from plate 31 by internally threaded spacing columns 42 carried by plate 31 and internally threaded bosses 43 carried by block 32. Bolts 44 and screws 45 are projected through plate 30 and engaged with internally threaded columns 42 and bosses 43 respectively. Thus jaws 29 are free to move between plates 30 and 31 and the several parts of the toggle mechanism for moving the jaws consisting of plunger 35 and links 38 are held in their proper assembled positions.

When plate 30 is removed, jaws 29 and links 38 may be unassembled and removed by lateral movement of the parts with respect to one another.

In operation, the tool is placed upon the package 3, as shown in full lines in Fig. 1, so that the saddle 2 supports the overlapped ends of the band and the tail-piece 5 bridges the band. The handle 16 is then operated so as to move the gripping wheels to the position shown in full lines in Fig. 2 into engagement with the upper end 10 of the band. During the time that the saddle is being placed under the overlapped ends, the wheel occupies the position shown in dotted lines in Fig. 2.

The operator then grasps holding handle 7 securely with one hand and with the other hand, oscillates operating lever or handle 24 through a rather small range of movement such as indicated by the full and dotted lines at the right of Fig. 1. This oscillation of handle 24 is communicated to head 21 because latch 26—27 will, during such movements, cause the operating handle and head to move together. The oscillations of head 21 cause the gripping wheels to rotate in the manner heretofore described during each downward movement thereof and thereby move the overlapping end 10 of the band over the stationary overlapped end 9 thereof, thereby drawing the band tightly about the package. During the upward or idle movements of the oscillations of the operating handle, pawl 22 prevents reverse rotation of the gripping wheels and thereby retains the tension in the band. During the band tensioning operation the fastening or sealing mechanism does not function.

When the band has been drawn sufficiently tight the operator then places a sleeve or girth 46 over the overlapped ends of the band in front of the saddle of the tool and by prolongation of the movement of said lever swings the operating handle over to the left, carrying head 21 into an upright position as shown by the dotted lines of Fig. 1 and in Fig. 2. In this position the head strikes a stop S projecting from frame 1 and its further movement is arrested. The sealing mechanism is now in position to perform its function while the release of latch 26—27 permits the operating lever to be moved still further to the left to actuate the same.

The operating handle is now in a relatively horizontal position, extending to the left of the body of the tool as viewed in Fig. 1 and by exerting pressure thereon jaws 29, through the agency of the link motion heretofore described, are caused to close tightly and draw the overlapping ends of band 4, together with the sleeve or girth thereabout, tightly into engagement with teeth 31' so as to deform the band and girth in the manner shown in Fig. 6. It is to be noted that this final or sealing movement of handle 24 is effected primarily in a downward direction, so that the operator's weight may be fully utilized in performing the ordinarily more difficult task of deforming the bands and sleeve to form the joint or seal, and also to hold the tool in position on the package.

After the seal or joint is made the jaws may be released by raising the lever 24, the tool may then be lifted from the band and the process repeated with other bands at different portions of the package until the package is satisfactorily bound.

In Figs. 7 and 8, we have illustrated a modified form of the invention which differs from the preferred form in the construction of the fastening or sealing mechanism. The tensioning mechanism is substantially the same as that shown in Fig. 1 and includes a body 1', a saddle 2', a tail-piece 5', with a handle 7', gripping wheels 12' having an arm 15' carrying a hand grip 16' by means of which the shaft 14' is moved to raise and lower the gripping wheels in precisely the same manner as in the preferred form.

The mechanism for advancing the gripping wheels comprises a head 21' pivotally supporting an operating lever 24' which is normally held in the position shown in full lines of Fig. 7 by latch 26'—27'.

In this modified form, however, the saddle 2' has a forwardly extending portion 47, having formed therein on the upper surface four depressions 48, and being further formed with a forwardly extending lip 49.

Head 21' has a pair of parallel spaced laterally offset portions 50 at the uppermost parts thereof as viewed in the position shown in Fig. 7, and a plunger 51 is slidably mounted therebetween. Plunger 51 has, at its outer end, four longitudinally extending angular teeth 52 similar to teeth 31' described in the preferred form of the invention. A spring 53 normally retracts plunger 51 within portions 50 of head 21'.

Teeth 52 are so arranged as to accurately register with depressions 48 in portion 47 of the saddle.

A locking pawl 55 is pivotally mounted at 56 to and between, portions 50 of the head. Pawl 55 has two inwardly extending hooks 57 separated sufficiently to accommodate the band between them and adapted to engage under ledge or lip 49 when the tool is in sealing position, as most clearly shown by the dotted lines of Fig. 7. The other end of pawl 55 is in position to be engaged by a cam surface 58 formed on the inner end of lever 24' beyond its pivotal support 59 so that when head 21' and handle 24' are moved to the position shown in dotted lines in Fig. 7 pawl 55 will be moved to the second dotted line position, indicated at 60, and engage under lip 49, thus locking head 21' with respect to the saddle.

Continued movement of handle 24' will cause cam 58, to force plunger 51 downwardly and deform the overlapped ends 9 and 10 of band 4 which, prior to this time, have been partially enveloped with a girth or sleeve 46 as already described in connection with the other form of tool.

While we have shown and illustrated in Figure 6 member 46 as a sleeve or girth, it should be understood that any one of several types of seals, such as a channel having diverging sides, split sleeves, or the like, may be employed with equal success.

As in the case of the preferred form, the operation of the tool, illustrated in Figs. 7 and 8, consists in placing the tool with the saddle supporting the overlapped ends 9 and 10 of band 4. Then in moving arm 15', so as to cause the gripping wheels to engage with end 10 of the band, and force the under end against the stationary gripping surface and next oscillating handle 24' with its head 21' to advance the wheels and put the band under tension.

When the tension of the band is sufficient, the operating handle with its head, is moved to the position shown in dotted lines where continued movement of the handle opens the latch 26'—27' and locks the head in place by operation of pawl 55 as described. Then further downward movement or pressure of handle 24' with one hand while the other bears down on the handle 7' completes the fastening operation as previously explained.

While we have illustrated and described two specific embodiments of our invention, many modifications may be made without departing from the spirit of the invention, and we do not wish to be limited to the precise details set forth; but desire to avail ourselves of all changes within the scope of the appended claims.

Having thus illustrated and described the nature and two embodiments of our invention, what we claim as new and desire to secure by Letters Patent of the United States is as follows:

1. A package banding tool comprising a saddle for supporting the overlapped ends of a binder band when wrapped about a package or the like, a frictional gripping wheel, means for moving the gripping wheel into engagement with the uppermost one of the overlapped ends of the band, means operable by a lever for advancing the gripping wheel to cause relative movement between the ends of the band to draw the band under tension about the package and other means operable by said lever for fastening the overlapped ends of the bands to one another while under tension.

2. A package banding tool comprising a saddle for supporting the overlapped ends of a binder band when wrapped about a package or the like, a handle for holding the tool down upon the package, a frictional gripping wheel for engagement with the uppermost one of the overlapped ends of said band, means operable by a lever for advancing the gripping wheel to tighten the band about said package and other means operable by said lever for fastening the overlapped ends of the bands to one another.

3. A package banding tool comprising a saddle for supporting the overlapped ends of a binder band when wrapped about a package or the like, a handle for holding the tool down upon the package, a frictional gripping wheel, means for moving the gripping wheel into engagement with the uppermost one of the overlapped ends of the band, means operable by a lever for advancing the gripping wheel to cause relative movement between the ends of the band to draw the band under tension about the package and other means operable by said lever for fastening the overlapped ends of the band to one another while under tension.

4. A unitary package banding tool comprising stretching mechanism for effecting progressive relative movement past one another of the overlapping ends of a package band, sealing mechanism for interconnecting the overlapped ends of the band, and a lever common to the stretching mechanism and the sealing mechanism for progressively moving the band ends past one another step by step upon successive movements of the lever to subject the band cumulatively to any desired tension and for operating the sealing mechanism upon a prolongation of a movement of the lever.

5. A unitary tool for tensioning and effecting a seal-joint in a package band comprising a stretching mechanism for causing cumulative movements past one another of the overlapping ends of the band, said stretching mechanism including an element frictionally engageable with one end of the band, and means for progressively advancing said frictional engaging means at will, a sealing mechanism for interconnecting the overlapped ends of the band, and a lever common to the frictional band engaging member actuating mechanism and the sealing mechanism whereby the stretching mechanism may be operated independently of the sealing mechanism to subject the band to tension prior to the sealing operation and wherein prolongation of the movement of said lever for stretching the band effects operative relationship between said lever and said sealing mechanism.

6. A unitary tool for tensioning and effecting a seal-joint in a package band comprising a stretching mechanism for causing progressive relative movement of the overlapping ends of the package band past one another, said stretching mechanism including a friction wheel for engaging one end of the band and mechanism for progressively advancing the wheel at will, a sealing mechanism for interconnecting the overlapped ends of the band, and a lever common to the friction wheel actuating mechanism and to the sealing mechanism whereby the stretching mechanism may be operated independently of the sealing mechanism to subject the band to progressive and cumulative tension prior to the sealing operation and wherein prolongation of the movement of said lever for stretching the band effects operative relationship between said lever and said sealing mechanism.

7. A unitary tool for tensioning and effecting a seal-joint in a package band comprising a base, a stretching member movably mounted upon the base, mechanism for frictionally engaging one of the overlapped ends of the package band, means associated with the stretching member for advancing the band end engaging mechanism progressively to cumulatively tension the band upon oscillation of said stretching member, and a hand lever pivotally mounted upon the stretching member to facilitate manual oscillation of the member, a sealing mechanism carried by the stretching member and operated by relative movement between said lever and said member to interconnect said overlapped band ends.

8. A unitary tool for tensioning and effecting a seal joint in a package band comprising a stretching mechanism for causing progressive relative movement of the overlapping ends of the package band past one another, means associated with the stretching mechanism and operative in one position to actuate the same and a sealing mechanism for interconnecting the overlapped ends of the band and operatively connected with said means to be actuated thereby in another position thereof to effect interconnection of the band ends.

9. A unitary tool for tensioning and effecting a seal joint in a package band comprising a stretching mechanism for causing progressive relative movement of the overlapping ends of the package band past one another, means associated with the stretching mechanism and operative in one position to actuate the same, and a sealing mechanism for interconnecting the overlapped ends of the band and operatively connected with said means to be actuated thereby in another position thereof to effect interconnection of the band ends, said means being operatively disconnected from the stretching mechanism in the other position while the stretching mechanism is operative to hold the band ends against relative movement while said means is operated to actuate the sealing mechanism.

10. A unitary tool for tensioning and effecting a sealing joint in a package band, comprising a stretching mechanism for causing cumulative movements past one another of the overlapping ends of the band and including means for clamping said ends against reverse movement, a single operating lever operatively connected with the stretching mechanism for actuating the same in one position of the lever and disconnectable therewith to move to a second position, and a sealing mechanism also having operative connection with the lever and movable therewith from a first position to a second position for engaging the overlapped band ends and actuated by the lever in its second position independently of the stretching mechanism for deforming the overlapped band ends to connect the same.

In witness whereof, we hereunto subscribe our names this 3rd day of August, 1927.

GERT KOOL.
ADRIANUS van DUYN.